Patented Feb. 16, 1937

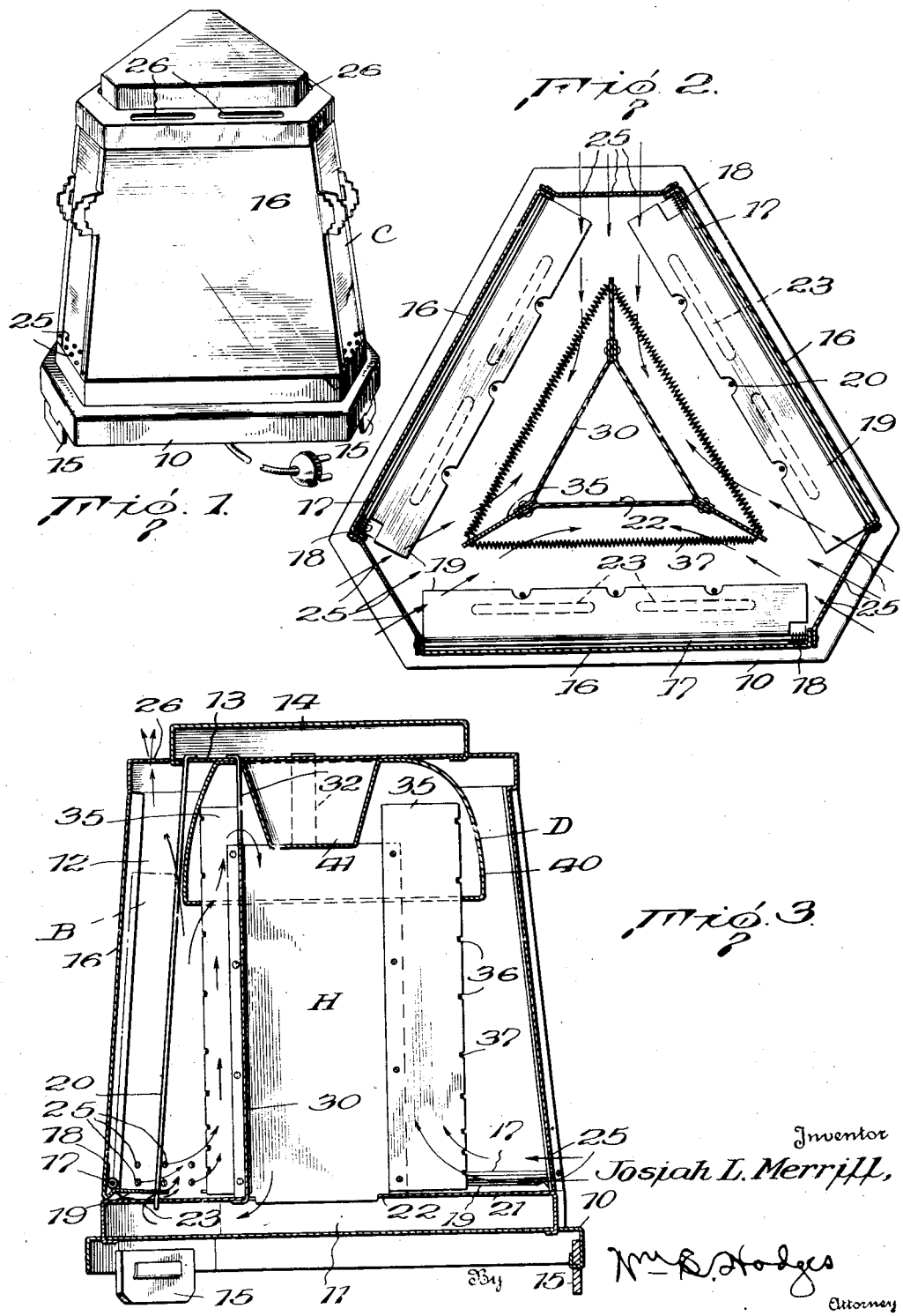

2,071,234

UNITED STATES PATENT OFFICE 2,071,234

ELECTRIC TOASTER

Josiah L. Merrill, Elmhurst, N. Y.

Application August 21, 1934, Serial No. 740,828

11 Claims. (Cl. 219—19)

This invention is a device appertaining to the class of electric toasters for sliced bread and the like.

One of the objects of the invention is to provide an electric toaster of simple and inexpensive construction, by means of which a maximum toasting efficiency is obtained for any given current input. A further object is to provide an electric toaster so constructed and arranged as to develop a convection flow of air currents at high temperatures, and to so divert said currents from their normal directional flow as to cause them to travel in contact with the surfaces of the bread to be toasted, at reduced temperature, and in such manner as to effect uniform heating of said surfaces.

The invention will be hereinafter fully set forth and particularly pointed out in the claims.

In the accompanying drawing:—

Figure 1 is a perspective view illustrating an electric toaster embodying with the invention. Figure 2 is a transverse sectional view. Figure 3 is a vertical sectional view.

Referring to the drawing, C designates a casing preferably constructed of sheet metal, the same comprising a base 10, an air chamber 11, a toasting chamber 12 and a top wall 13, and a top-finishing piece 14. The base is provided with suitable legs 15 preferably constructed of fiber. The toasting chamber 12 is provided with doors 16 of any desired construction, preferably hinged at their lower ends as indicated at 17, and normally impelled to closed position by suitable springs 18. Each door is provided with a toast support or shelf 19 and the usual grid 20, to maintain the slice of toast B in a vertical position. The doors 16 and the toast-supporting means may be of any desired construction such as any of the forms now in commercial use.

The toasting chamber 12 and the air chamber 11 are separated by a partition wall 21, which is provided with a central inlet opening 22 and a plurality of escape openings 23, as shown. The toasting chamber is provided with main air inlet openings 25 located in a plane above the partition wall 21, and also with outlet openings 26 in the top wall of the casing.

Centrally located within the casing is a vertically disposed conduit 30, for conducting heated air from the top of the casing to the air chamber 11, said conduit being enclosed by the resistor elements. This conduit may be provided in any desired manner, but it is preferred to construct the heater unit H with a hollow core 30, having flanges 31 at its lower end extended through the inlet opening 22, and bent back in a well known way to anchor the lower end of the core in such manner that the core will be in communication with the air chamber 21. The upper end of the core is secured by means of strips 32 to the top wall 13. The openings 23, 25, and 26 may be in the form of perforations or slots as may be desired. It will be noted that the casing C is of approximately triangular form in horizontal cross section, and that the core 30 is of corresponding form. At the corners of the core are arranged a plurality of radially disposed fins 35, provided with grooves or notches 36 to receive the resistor 37 which is wound around the core in a manner well understood in the art. It will be observed, however, that the fins 35 are of such dimensions as to hold the wires 37 in spaced relation with respect to the body of the core.

Suspended from the top wall 13 is a deflector member D, which is provided with an external skirt portion 40 extending downwardly over the upper end of the heater unit into the space between said unit and the doors, the lower edge of said skirt coming slightly below the plane normally occupied by the upper edge of the slice of bread B. Said deflector is also provided with a central skirt-like portion 41, so positioned as to depend into the upper end portion of the hollow core 30, thereby providing a channel of communication beneath the deflector D, leading from the toasting chamber 12, over the upper end of core 30 and to the interior of said core.

In practice, advantage is taken of the discovery that a more uniform distribution of heat over the surfaces to be heated is obtained by diverting the convection currents from their normal direction of flow over the heater unit, and so controlling the stream flow that said convection currents may be delivered into the heating chamber in the vicinity of and below the bread, and exhausted at the top of the casing, thereby causing the currents at reduced temperature to travel in contact with the exposed surface of the bread.

In operation, the radiant heat emanating from the coils 27 is of sufficient intensity to create a strong convection current, which will induce outside air to enter through the openings 25 in the corners of the casing, and to flow directly to the core and upwardly along the latter. This convection flow will exist in planes both outside of the coil and inside the coil between it and the core. These currents as they travel upwardly are caught by the skirt 40 of the deflector D and diverted inwardly and downwardly by the main portion of the deflector and the skirt portion 41, so that they are introduced into the interior of the core 30, at the upper end thereof. As the currents are diverted, the cooler space within the core 30 induces a downward flow thereof, through the inlet opening 22 and into the air chamber 11. The air in the toasting chamber being hotter than the air in chamber 21 induces the convection flow to continue its travel upwardly through the escape openings 23 into the toasting chamber. In this connection, it will be noted that these escape openings 23 are so located as to discharge the convection currents into chamber 12, in the vicinity of the inner surface of the bread B. From this position the convection flow will continue upwardly adjacent to and in contact with the surface of the bread, and the air is finally vented outwardly through the openings 26. The openings 23 in the partition wall 21 are located adjacent to the sides of the casing at positions between the inflowing streams of air entering at the corners of the casing through the openings 25, so that there is no appreciable intermingling of the incoming outside air and the re-circulated air passing through the core 30 and chamber 11, although a part of the re-circulated air may mix with the heated outside air as the latter travels upwardly along the heater core, and will again be divided into the core by deflector D. Only enough external air is admitted and discharged to carry off the moisture which has to be discharged. Thus, the convection current flowing along the inner surface of the bread performs the toasting operation by conduction at an approximately uniform temperature applied evenly over the entire surface to be toasted. In this manner scorching of the bread is prevented and greater uniformity in cooking is obtainable. It will be observed that the spacing between the coil 37 and the core 30 and also with respect to the bread holders is such that, taken in connection with the deflector D, the desired convection flow in the vicinity of the bread is not disturbed by the faster and more intensely heated convection air current which flows in close proximity to the heating unit.

The advantages of the invention will be readily understood by those skilled in the art to which it belongs. It will be particularly noted that the construction described and illustrated provides means by which a hot air circulation may be obtained, in such manner as to assure a uniform distribution of heat over the surface of the article to be heated. For instance, the normal approximate temperature of the resistance coil is not less than 1200° F., which sets up a positive vertical air circulation over the heater core. This is deflected by the shield over the top, and downwardly through the center of the heater core into the air chamber, in such manner that it may be delivered at a position that will direct the current over the inside surface of the bread, at approximately 600° F.

Having thus explained the nature of the invention and described an operative manner of constructing and using the same, although without attempting to set forth all of the forms in which it may be made, or all of the forms of its use, what is claimed is:—

1. An electric heater comprising a casing provided with a toasting chamber having air inlets and air outlets, means for supporting bread within said chamber, means for providing a vertically disposed air channel, electric heating means encircling said air channel, deflector means located above said heating means and said air channel in such a position as to direct the convection currents which normally travel upwardly along the heating means into the upper end of said channel, and means for conducting air from the lower end of said air channel to the lower portion of the toasting chamber at a position between the heating means and the bread holding means, said air inlets and said air outlets, together with said central channel, said deflector means and the means for conducting air from the lower end of said channel, being so constructed and arranged as to provide a continuous convection stream from the inlets to the outlets.

2. An electric toaster comprising a casing provided with a toasting chamber having air inlets and air outlets, means for supporting bread within the chamber, a vertically disposed electric heating unit provided with a hollow core, diverting means supported above the heating unit for intercepting the convection currents which normally flow upwardly along the outer surface of said heating unit and diverting said convection currents downwardly into the upper end of said core, and means for conducting the diverted convection currents from the lower end of said core into the lower portion of the toasting chamber at a position adjacent the bread-holding means, said air inlets and air outlets being so relatively arranged with respect to said core and with respect to each other that air currents are constantly flowing from the air inlets to the air outlets.

3. An electric toaster comprising a casing provided with a toasting chamber having air inlets and air outlets, means for supporting the article to be toasted, resistor means within the casing, said air inlets being so positioned as to admit air to the casing at positions adjacent the bottom of said resistor means, a deflector shield supported at the top of the casing and having a portion overhanging and partially enclosing the upper portion of the resistor means in such manner as to intercept the incoming air currents which by convection are induced to travel upwardly in the space adjacent said resistor means, said deflector shield having means for directing the intercepted convection currents downwardly at the center of the casing, and means for conducting the downwardly deflected convection currents into the lower portion of the toasting chamber at positions between the resistor means and said supporting means, said air outlets being located at the top of said toasting chamber.

4. An electric toaster comprising a casing provided with a toasting chamber having air inlets and air outlets, means for supporting the article to be toasted, a central vertically disposed air conduit, resistor means encircling said conduit, said air inlets being so positioned as to admit air to the casing at positions adjacent the bottom of said resistor means, a deflector shield supported at a position above the upper end of said air conduit and having a portion overhanging and partially enclosing the upper portion of the resistor means in such manner as to intercept the incoming air currents which by convection are induced to travel upwardly in the space adjacent said resistor means, said deflector shield having means for directing the intercepted convection currents downwardly into said air conduit, and means for conducting the deflected air from the lower end of said conduit to the lower portion of the toasting chamber at positions between the resistor means and said supporting means, said air outlets being located in the top of said toasting chamber at positions outside of said deflector shield.

5. An electric toaster comprising a casing provided with a toasting chamber having air inlets and air outlets, means for supporting the article to be toasted, an air chamber below the toasting chamber and communicating with the lower portion of said chamber, resistor means within said casing, said air inlets being so positioned as to admit air to the casing at positions adjacent the bottom of the resistor means, a deflector shield supported at the top of the casing and having a portion overhanging and partially enclosing the upper portion of said resistor means in such manner as to intercept the incoming air currents which by convection are induced to travel upwardly in the space adjacent said resistor means, said deflector shield having means for directing the intercepted convection currents downwardly at the center of the casing, means for conducting the downwardly directed convection currents into said air chamber, so that they are free to flow into the lower end of the toasting chamber, said air outlets being located in the top of the toasting chamber at positions outside of said deflector shield.

6. An electric toaster comprising a casing provided with an air chamber and a superposed toasting chamber separated by a partition wall having a central inlet opening therein, and one or more escape openings communicating with the toasting chamber, said toasting chamber having air inlet means and air outlet means, means for supporting bread within said toasting chamber, a vertically disposed electric heating unit provided with a hollow core having its lower end in communication with the air chamber through said inlet opening, and means for diverting the normally upwardly flowing convection air currents adjacent said heating unit in such manner as to deliver them into the upper end of said core, said air chamber being so constructed and arranged as to deliver said diverted convection currents into the toasting chamber through said escape openings.

7. An electric toaster comprising a casing provided with a toasting chamber having air inlets and air outlets, means for supporting bread within said chamber, a vertically disposed heater unit provided with radial fins, a resistor supported by said fins in such manner as to be spaced from said core, so that convection currents will travel upwardly between the resistor and the core, means for diverting the said convection currents into the upper end of said core, and means for delivering the diverted convection currents into the lower portion of the toasting chamber at a position between the heating unit and the bread-holding means.

8. An electric toaster comprising a casing provided with a toasting chamber having air inlets and air outlets, means for supporting bread within said chamber, a vertically disposed heater unit provided with radial fins, a resistor supported by said fins in such manner as to be spaced from said core, so that convection currents will travel upwardly between the resistor and the core, means for diverting the said convection currents into the upper end of said core, a deflector supported in the upper part of said casing and having a portion enclosing the fins and resistor of the heater unit in such manner as to divert the convection currents into the upper end of said core, and means connected with the lower end of said core for delivering the diverted convection currents into the lower portion of the toasting chamber at a position between the heating unit and the bread-supporting means.

9. An electric toaster comprising a casing provided with a toasting chamber and an air chamber separated by a partition wall, said toasting chamber having air inlet openings at a position above the plane of said air chamber, and air outlet openings at its top, said partition wall having escape openings therein adjacent the walls of the casing and communicating with said toasting chamber, a vertically disposed heating unit including a hollow core having its lower end in communication with said air chamber, means for supporting one or more slices of bread within the toasting chamber, and a deflector extended over the upper end of the heating unit in such manner that it will cause upwardly travelling convection currents adjacent said heating unit to be deflected downwardly through the core into said air chamber, said escape openings being so positioned as to cause the diverted convection air currents entering the toasting chamber to travel in contact with the inner surface of the bread.

10. An electric toaster comprising a casing of triangular form in horizontal section, said casing being provided with a toasting chamber having air inlets and air outlets, hinged doors closing the toasting chamber and provided with means for supporting the bread to be toasted, a vertically disposed electrical heating unit provided with a core having a cross section similar to that of the casing, means for diverting the convection currents which normally flow upwardly along the heating unit and delivering the diverted convection currents into said core, and means associated with said core for delivering the diverted convection currents into the lower portion of the toasting chamber at a position between the heating unit and the doors.

11. An electric toaster comprising a casing of approximately triangular form in horizontal cross section, said casing being provided with a toasting chamber having air inlets and air outlets therein, doors pivoted to said casing and normally closing the toasting chamber, said doors being provided with bread-holding means, a vertically disposed core of a cross section complemental to that of said casing, said core being provided with fins extended radially therefrom at the corners thereof, an electric resistor wound upon said fins in such manner as to provide a space between the resistor and the core, and a deflector supported at the top of the casing in such manner as to overhang and partially enclose the upper portion of the heating unit, said deflector having means for diverting upwardly flowing convection air currents into said core, and means associated with the lower end of said core for delivering the diverted convection currents into the lower portion of the toasting chamber adjacent said doors.

JOSIAH L. MERRILL.